United States Patent [19]

Layton

[11] Patent Number: 4,666,022

[45] Date of Patent: May 19, 1987

[54] WEDGE-TYPE BRAKE ACTUATOR

[75] Inventor: Charles T. Layton, Birmingham, Mich.

[73] Assignee: Lucas Industries Public Limited Company, Birmingham, England

[21] Appl. No.: 750,500

[22] Filed: Jul. 1, 1985

[51] Int. Cl.[4] .............................................. F16D 65/22
[52] U.S. Cl. ........................................ 188/343; 74/110
[58] Field of Search ............. 188/343, 364, 368, 72.7; 74/110, 526

[56] References Cited

U.S. PATENT DOCUMENTS

| 3,037,584 | 6/1952 | Cox et al. | 74/110 X |
| 3,113,466 | 12/1963 | Osborne | 74/110 |
| 3,139,762 | 7/1964 | Alfieri | 188/364 X |
| 3,388,606 | 6/1968 | Hill | 188/343 X |
| 3,831,720 | 8/1974 | Williams | 188/343 |
| 4,051,737 | 10/1977 | Hill | 74/110 |
| 4,280,603 | 7/1981 | Kanwar | 188/343 |
| 4,519,482 | 5/1985 | Ott et al. | 188/343 |

FOREIGN PATENT DOCUMENTS

| 2147435 | 3/1973 | Fed. Rep. of Germany | 188/343 |
| 2343860 | 3/1974 | Fed. Rep. of Germany | 188/343 |

*Primary Examiner*—Duane A. Reger
*Attorney, Agent, or Firm*—Harness, Dickey & Pierce

[57] ABSTRACT

A wedge-type actuator for a drum type brake including a positive stop for limiting the degree of relative movement between the cage and the wedge for avoiding push through. The stop is operative between the cage and a member other than the wedge for limiting the forces exerted on the unit during its operation.

2 Claims, 6 Drawing Figures

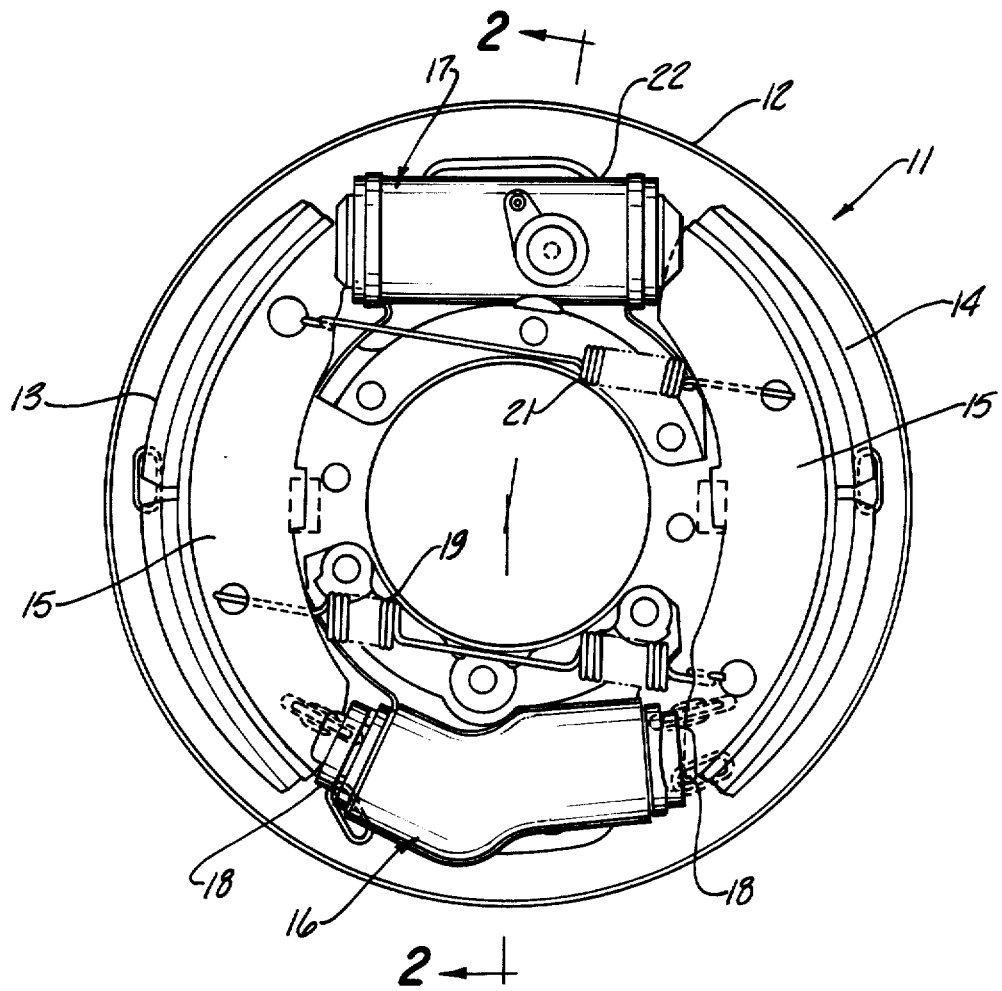
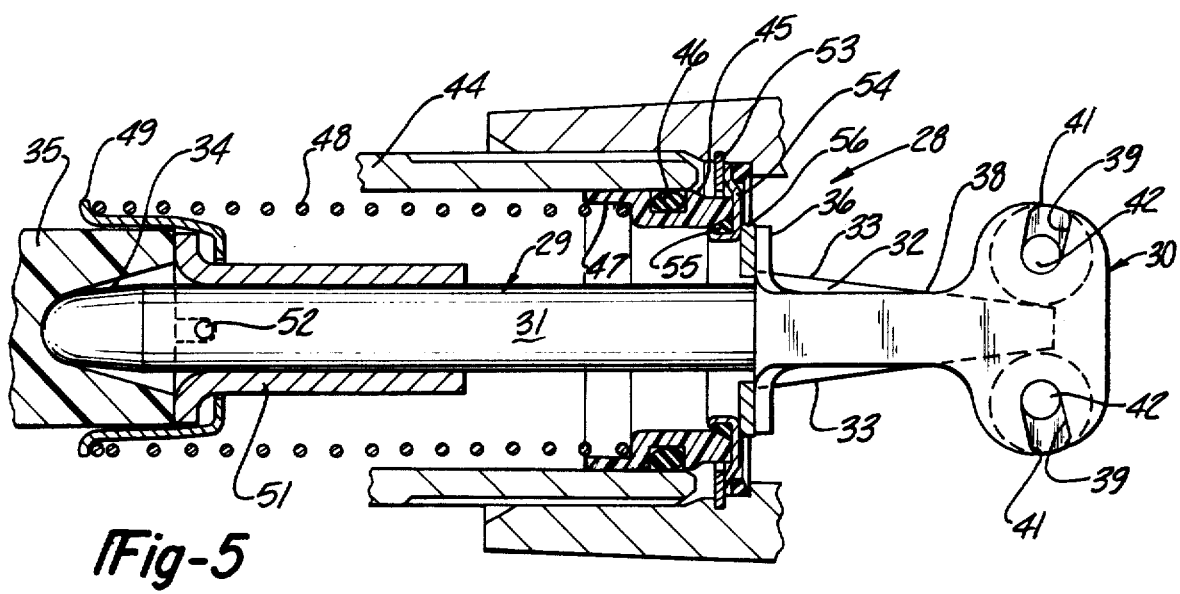

WEDGE-TYPE BRAKE ACTUATOR

BACKGROUND OF THE INVENTION

This invention relates to a wedge-type brake actuator and more particularly to an improved wedge and roller type brake actuator.

A wedge or wedge and roller type actuator is employed frequently in drum-type brakes. Such a wedge-type actuator includes an actuating wedge that operate to urge a pair of rollers that are slidably and rotatably supported within a cage into engagement with a brake shoe or other element which engages the brake shoe for urging the brake shoes into actuating engagement with an associated brake drum. This type of actuator has many advantages and can significantly reduce operating loads due to the use of the interposed rollers and the associated mechanism. However, it is sometimes possible for circumstances to arise in which the wedge, which has the inclined surfaces that engage with the rollers, passes beyond the rollers. Furthermore, it is desirable to maintain the timing relationship between the wedge and rollers and such push through can result from the loss of this relationship.

It is, therefore, a principal object of this invention to provide an improved wedge-type actuator for brakes.

It is a further object of this invention to provide a wedge-type brake actuator that will avoid the possibility of push through where the rollers move past the inclined wedge surface and onto the wedge shank.

In accordance with the invention, an arrangement is provided for limiting the degree of relative movement between the wedge actuator and the roller carrying cage. This arrangement can effectively prevent push through. However, when such a positive stop is provided to limit the relative movement, there can arise a risk that the forces encountered will be unduly high and can damage the mechanism due to the mechanical advantage between the rollers and the inclined wedge surface.

It is, therefore, a further object of this invention to provide an improved stop mechanism for a wedge-type actuator that will eliminate push through without loading the cage and rollers to a degree not tolerable by typical existing embodiments.

SUMMARY OF THE INVENTION

This invention is adapted to be embodied in a wedge and roller-type brake actuator comprising a pair of oppositely acting brake actuating elements. A cage carries a pair of rollers each of which is engaged with a respective one of the brake actuating elements. The cage is supported for movement along a path normal to the direction of action of the actuating elements. A wedge member is supported for reciprocation along that path and between the rollers and has inclined faces that are adapted to engage the rollers for urging the rollers outward to actuate the brake upon movement of the wedge. In accordance with the invention, stop means are incorporated for limiting the relative movement between the wedge and the cage.

BRIEF DESCRIPTION OF THE DRAWINGS

FIG. 1 is a side elevational view of a drum type brake having a wedge actuator constructed in accordance with an embodiment of the invention.

FIG. 5 is a further enlarged view looking in the same general direction as FIG. 3 and shows the elements of the wedge actuator.

DETAILED DESCRIPTION OF THE PREFERRED EMBODIMENT

Figure 2:
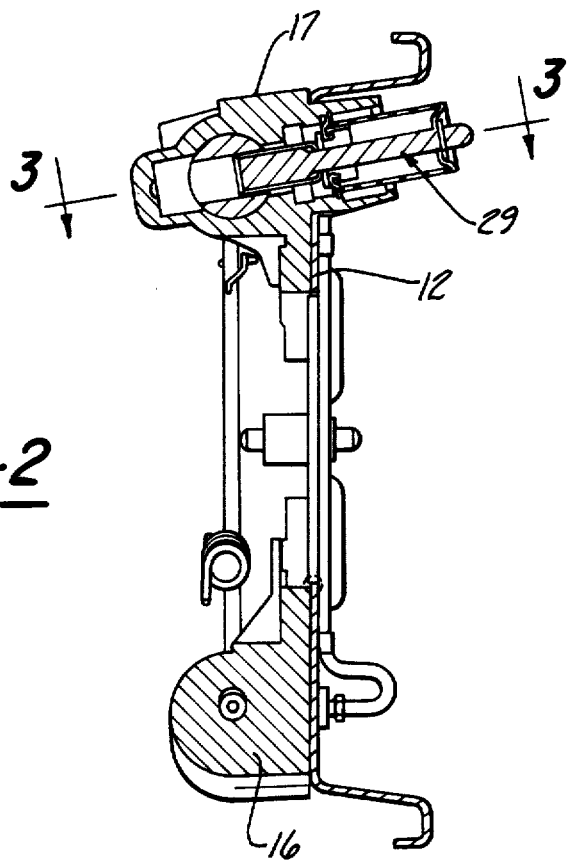
FIG. 2 is a cross-sectional view taken along the line 2—2 of FIG. 1.

Referring first to FIG. 1, a two leading shoe drum type brake incorporating a wedge actuator constructed in accordance with an embodiment of the invention is identified generally by the reference numeral 11. Although the invention is described in conjunction with such a type of drum brake, it should be readily apparent to those skilled in the art that the instant invention may be utilized in any of the known types of applications for wedge actuated brakes. That is, the environment described is only considered to be a typical one of many environments in which the invention may be employed.

The brake 11 includes a backing plate 12 that is adapted to be affixed in any suitable manner to an associated vehicle and which cooperates with a rotating drum (not shown). A pair of brake shoes 13 and 14 are slidably supported by the backing plate 12 in a known manner and have respective web portions 15.

A first wheel cylinder, indicated generally by the reference numeral 16, has a pair of internal fluid pistons that act against respective plungers 18 which, in turn, engage the ends of the brake shoe webs 15 for urging the brake shoes 13 and 14 outwardly into engagement with the associated drum. In a similar manner, a second wheel cylinder assembly 17 is disposed adjacent the opposite ends of the webs 15 and operates in a similar manner so as to urge the shoes 13 and 14 outwardly into engagement with the rotating drum. The cylinder assembly 17 includes a wedge-type actuator constructed in accordance with the invention.

A pair of retractor springs 19 and 21 are interposed between the webs 15 for retracting the brake in a known manner.

The cylinder assembly 17 includes a main housing portion 22 having an internal bore 23 in which a pair of hydraulically operated pistons 24 and 25 are positioned. The pistons 24 and 25 carry respective plunger portions 26 and 27 in which the corresponding ends of the webs 15 of the brake shoes 13 and 14 are received for hydraulic actuation of the brakes. As has been noted, the particular type of brake assembly in which the wedge actuator, which forms the subject of the invention, is employed forms no part of the invention and, for that reason, this portion of the brake has not been described in any detail and it may take any conventional form.

Figure 3:
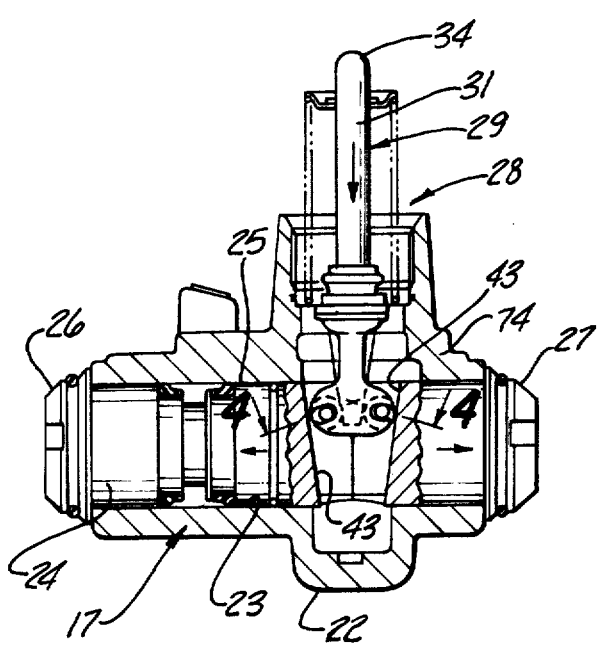
FIG. 3 is an enlarged view taken along the line 3—3 of FIG. 2 and showing the wedge actuator.
Figure 4:
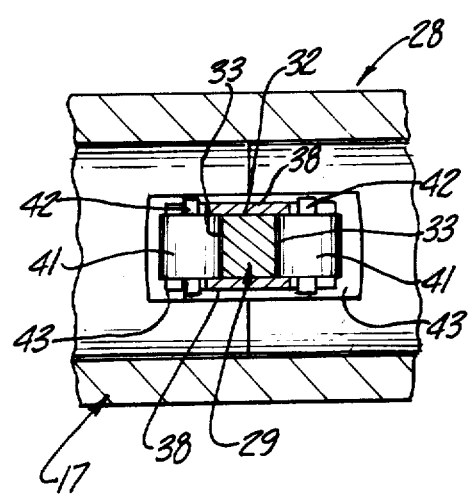
FIG. 4 is a further enlarged view taken along the line 4—4 of FIG. 3.
Figure 6:
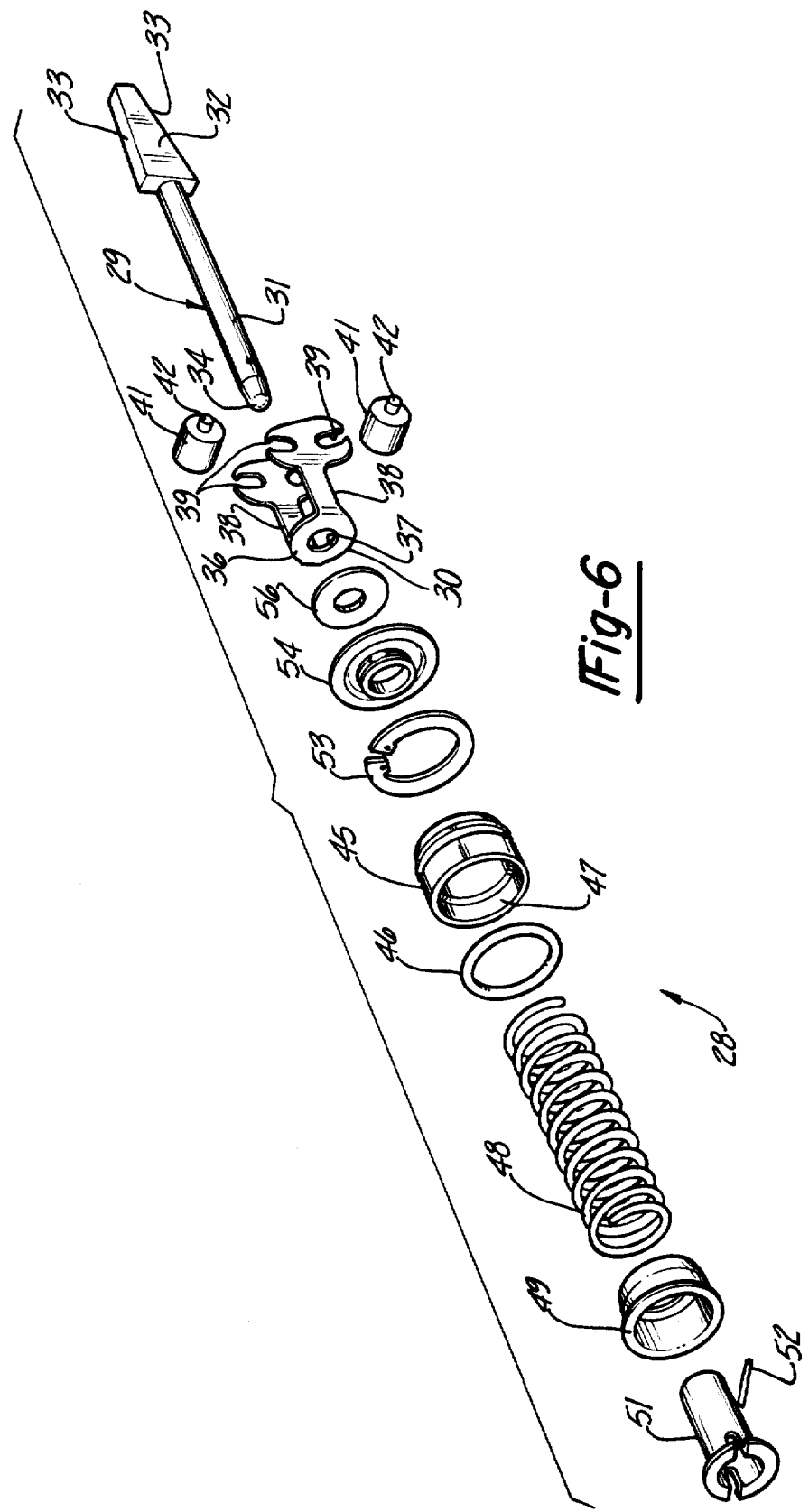
FIG. 6 is an exploded perspective view of the wedge actuator elements.

The wedge-type actuator is identified generally by the reference numeral 28 and appears in most detail in FIGS. 3 through 6. This wedge actuator 28 includes a wedge member, indicated generally by the reference numeral 29, that has a cylindrical shank portion 31 that terminates in a wedge 32 that has oppositely facing wedging surfaces 33. The surfaces 33 are inclined so that at their inner and they extend a greater distance than the diameter of the shank 31. In a perpendicular plane, the wedge 32 has a thickness that is equal to or slightly greater than that of the shank 31. The end of the shank 31 is formed with a rounded nose piece 34 that is adapted to be engaged by a suitable actuator 35 (FIG. 5) which may be of any type. For example, the actuator 35 may be of the spring applied fluid pressure release type, may be of the fluid pressure applied type, or may be of any of the other known types used for this purpose.

A cage, indicated generally by the reference numeral 30, is formed from sheet metal or the like and has a base portion 36 formed with an opening 37 through which the cylindrical shank 31 of the wedge 29 freely passes. A pair of arms 38 extend outwardly and forwardly from the base 36 and are formed with a pair of inclined slots 39.

Rollers, indicated by the reference numeral 41, have shank portions 42 that are journaled within the slots 39 in each of the arms 38. The rollers 41 are normally held in engagement with the wedge surfaces 33 through their contact with tapered faces 43 of members which are associated with the plunger members 25 and 27.

The wedge actuator 28 is received within an actuator tube 44 that is affixed in a suitable manner to the wheel cylinder housng 22. A molded plastic support 45 has an annular groove in which an O-ring 46 is received for sealing the support 45 to the end of the actuator tube 44. The support 45 may be interference fitted onto one end of a spring 48. The opposite end of the spring 48 acts against a retainer 49 which, in turn, encircles a sleeve 51 that is fixed axially to the wedge actuator member 29 by means of a pin 52. Hence, the spring 48 urges the wedge actuator member 29 toward a retracted position.

The sleeve 45 is held in place by means of a snap ring 53 that is received in an annular groove in the wheel cylinder 22 and which engages a retaining ring 54. The retaining ring 54 is sealed to the support 45 by means of an O-ring 55. A washer 56 encircles the wedge shank 31 and is normally held in engagement with the retainer 54.

The brakes are actuated by the wedge actuator 28 in the following manner. The actuating member 35 is operated in any of the aforedescribed types so as to urge the wedge member 29 to the right as viewed in FIG. 5 and downwardly as viewed in FIG. 3. When this movement occurs, the wedge surfaces 33 will urge the rollers 41 outwardly and cause the inclined surfaces 43 to be wedged apart. The cage 36 will move in the same direction but at a slower rate due to the inclined surfaces and the wedging action. Hence, there will be a mechanical advantage exerted on the inclined surfaces 43 so as to cause an amplification in the actuating force of the brake. If, for some reason, the wedge is held in a partially applied condition, insufficient to bring the shoes 13, 14 into contact with the drum and the vehicle is operated in this condition, it is possible for the cage 30 and rollers 41 to move back towards the retaining ring 54 under the effect of vibration. By this means, the wedge actuator mechanism can become out of phase. In this event, further application of the wedge could, with a conventional type wedge actuator, result in the wedging surfaces 33 passing rollers 41. The rollers 41 then engage the shank 31 of the wedge and can prevent retraction of the wedge 29 by the spring 48. In addition, damage to the rollers 41 and wedge shank 31 can result from their engagement under load.

With the instant invention, however, the end of the sleeve 51 will engage the washer 56 and cage 36 before this can occur. At this time, the reaction force exerted by the cage 36 will act directly back through the sleeve 51 to the actuating member 35 so there will be no force amplification in this direction. Hence, the device offers an extremely rigid stop and yet one which will operate in a very convenient and simple manner.

Release of the brakes is accomplished by the spring 48 urging the wedge actuator member 29 rearwardly and the return springs 19 and 21 causes the brake shoes 13 and 14 to retract and urge the rollers 41 inwardly and the cage 36 to follow the wedge actuator 29 toward its returned position.

It should be readily apparent from the foregoing description that a very simple and highly effective stop mechanism is provided that will ensure that the rollers do not travel beyond the limits of the inclined wedge surfaces.

Although an embodiment of the invention has been illustrated and described, various changes and modifications may be made without departing from the spirit and scope of the invention, as defined by the appended claims.

What is claimed is:

1. In a wedge and roller-type brake actuator comprising a pair of oppositely acting brake actuating elements, a cage carrying a pair of rollers each engaged with a respective one of said elements, said cage being supported for movement along a path normal to the direction of action of said actuating elements from a retracted position to an actuating position, a wedge member supported for reciprocation along said path and between said rollers and having inclined faces adapted to engage said rollers for urging said rollers outwardly to actuate said brake upon movement of said wedge member from a retracted position to an actuating position, and an actuating element adapted to actuate said wedge member from its retracted position to the actuating position, the improvement comprising stop means interposed between said actuating element and said cage, said stop means having a surface adapted to engage said cage for limiting the movement of said cage relative to said wedge member upon movement thereof toward their actuating positions.

2. In a wedge and roller-type brake actuator as set forth in claim 1 wherein the stop means comprises a sleeve encircling a cylindrical portion of the wedge member and adapted to engage the cage and means for fixing said sleeve axially relative to said wedge member.

* * * * *